Figure 1:
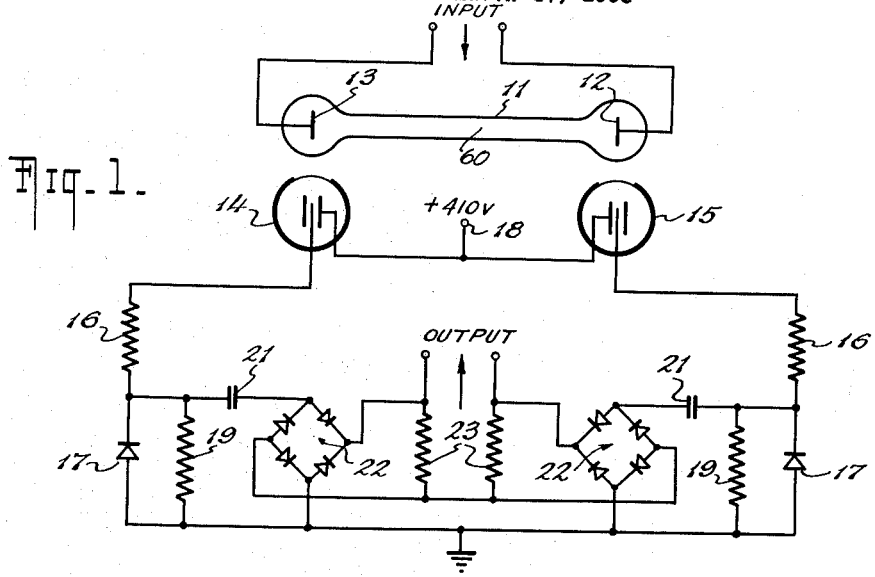

April 16, 1963

F. A. SUMMERLIN 3,086,118

INTEGRATING DEVICES

Filed March 17, 1958

INVENTOR
FREDERICK A. SUMMERLIN
BY
ATTORNEY

3,086,118
INTEGRATING DEVICES

Frederick Arthur Summerlin, Isleworth, England, assignor to The Sperry Gyroscope Company Limited, Brentford, Middlesex, England, a company of Great Britain
Filed Mar. 17, 1958, Ser. No. 721,781
Claims priority, application Great Britain Mar. 19, 1957
1 Claim. (Cl. 250—83.3)

This invention relates to a device for integrating quantities which can be represented by electrical currents and one object is to provide such a device, the accuracy of which does not depend to any great extent upon the precision with which it is manufactured.

According to the present invention an integrating device comprises an electrolytic cell in which a radio-active material is deposited when a current is passed, and a radio-active-disintegration-detecting device disposed to be responsive to disintegrations occurring at one of the electrodes of the electrolytic cell.

It is clear that if the electrolyte in the cell has at least a component which is radio-active, then since the mass of the material deposited from the electrolyte on to an electrode is proportional to the integral of the current flowing in the cell, and since the rate of radio-active disintegration from radio-active material is proportional to the mass of the material, the detecting device will give a measure of the integral of the current which has been flowing in the cell.

Thus, preferably, the electrolyte is a solution of a material of which at least a small percentage is radio-active. Conveniently also the electrodes have surfaces composed of the same material, at least a small proportion of which is radio-active.

The total radiation from the electrode of the electrolytic cell after current has been flowing for some time will be proportional to the double integral of the current, so that according as the detector is arranged to give the rate of radiation or the total number of radiations, a measure of the single or double integral of the current can be obtained.

In a preferred form of the invention a second disintegration-detecting device is similarly disposed to be responsive to radiation from the other electrode of the cell, and the two detecting devices are connected to a difference network which is arranged to give an output dependent upon the difference between the outputs of the two detecting devices.

In this way the effects of background radiation, which can be assumed to affect both detectors equally, can be balanced out. Moreover this arrangement makes the integrating device wander-free, so that the net output from the difference network is a true measure of the integral of the current which has been flowing since an initial time when the outputs from the two detecting devices were equal. The device is responsive to the direction of current flow, so that if the current reverses the output will start to change in the other sense.

Inasmuch as the rate of disintegration is proportional to the mass of material deposited, the output from the device will be substantially linear.

The invention may be carried into practice in different ways and certain embodiments will now be described by way of example with reference to the accompanying drawings of which each of the three figures is a circuit diagram showing how the outputs from the detecting devices may be used.

FIGURE 1 shows a device arranged to act as a single integrator of the current flowing in the electrolytic cell 11. The cell has an electrolyte consisting of an aqueous solution of a suitable cobalt salt, such as cobalt-chloride of which $3 \times 10^{-5}\%$ is radio-active cobalt 60. The electrodes 12 and 13 are of platinum coated with cobalt, of which the same percentage is radio-active. The quantity of radio-active material at each electrode is such as to give about 40 disintegrations per second.

Two identical halogen-quenched Geiger counters 14 and 15 are disposed each with its window opposite one of the electrodes of the electrolytic cell 11 so as to be responsive to as large a proportion as possible of the disintegrations occurring at the electrode. In practice the counter might be responsive to 50 percent of the disintegrations.

Each of the counters 14 and 15 is connected in series with a 1 megohm resistor 16 and a Zener diode rectifier 17 across a 410 volts H.T. supply 18. This diode rectifier has the property that in the conducting direction it has zero conductivity until the applied voltage exceeds a critical voltage, and a large conductivity above this voltage. Thus, if the rectifier is operated above the critical voltage, each disintegration recognized by the counter will produce a similar pulse in the output of the rectifier 17. The arrangement described gives an output of about 12 volts across the resistor 16 and the rectifier 17.

The rectifier 17 is shunted by a 1.7 megohm resistor 19 and is connected in series with a .01 microfarad condenser 21 to a full-wave bridge rectifier 22 whose output is connected across a 2.2 megohm resistor 23 forming one-half of a difference network which contains two of the resistors 23 with one end common and produces an output across the other ends equal to the difference between the currents in the two resistors.

The condensers 21 operate to differentiate the pulses generated each time a disintegration occurs, and after rectification by the bridge rectifier 22 the current flowing in the resistor 23 is proportional to the number of pulses per second, and thus proportional to the rate at which disintegrations are occurring.

This means that the output from the subtracting device will be proportional to the single integral of the current flowing in the electrolytic cell.

This can be seen from the following analysis:

If $m_1$ is the mass of radio-active material at one electrode together with the equivalent mass of radio-active material in the electrolyte in the vicinity of the electrode and the background radiation, and if $m_2$ is a like quantity from the other electrode, and if $\theta_1$ and $\theta_2$ are the proportions of total radiation detected by the counters 14 and 15, then in a zero position where the output from the difference network is zero $$m_1\theta_1 = m_2\theta_2 = Kn$$

where $n$ is the number of disintegrations detected.

If the passage of a current in the cell produces a change in mass of radio-active material from one electrode to the other of $dm$, the change in the current in the first counter will be $dm\theta_1 I/K$, and the change in the output of the other counter will be $-dm\theta_2 I/K$ where $I$ is the current output from each counter for each disintegration detected.

When these two outputs are subtracted the net change in the output of the difference network is equal to $dmI(\theta_1+\theta_2)/K$, and this is proportional to the transfer of mass, which is itself proportional to the integral of the current which has been flowing in the cell since the zero condition. If the current were flowing the other way, the change in the output of the difference network would have been of the other sense, so that the device is sensitive to the direction of current flow.

Figure 2:
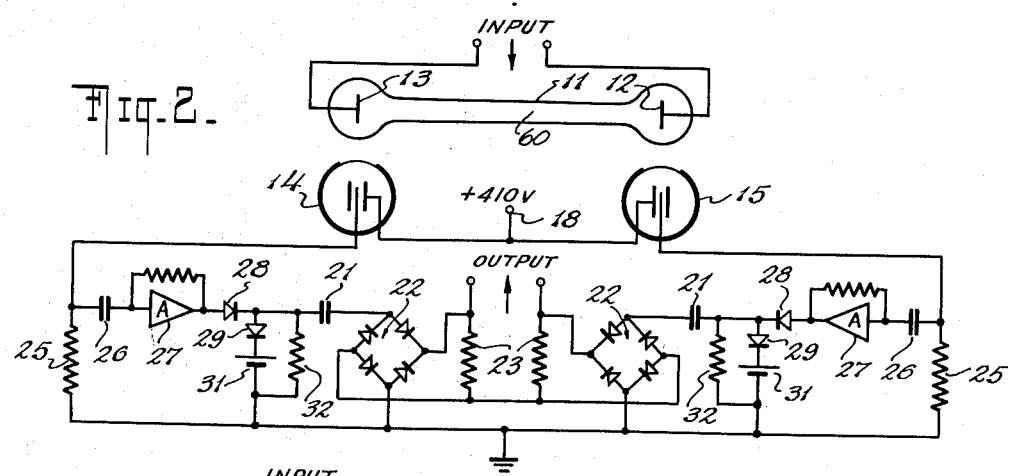

An alternative circuit is shown in the FIGURE 2. In this case the output from each of the counters 14 and 15 is taken across a series resistor 25 of 2.7 megohms in series with a condenser 26 and an amplifier 27 provided with resistive feedback. This differentiates the voltage appearing across the resistor 25 to make it roughly in the form of a straight-sided pulse for each disintegration detected, and the output from the amplifier 27 is passed through a clamping device consisting of a rectifier 28 in series and a shunt connection of a rectifier 29 and a battery 31 having a resistor 32 connected across them. The clamping device cuts off the top of the pulses and produces a square-shaped pulse which is fed into a counting circuit which is similar to the circuit described with reference to FIGURE 1 containing the condenser 21, the bridge rectifier 22, and the subtracter 23.

Figure 3:
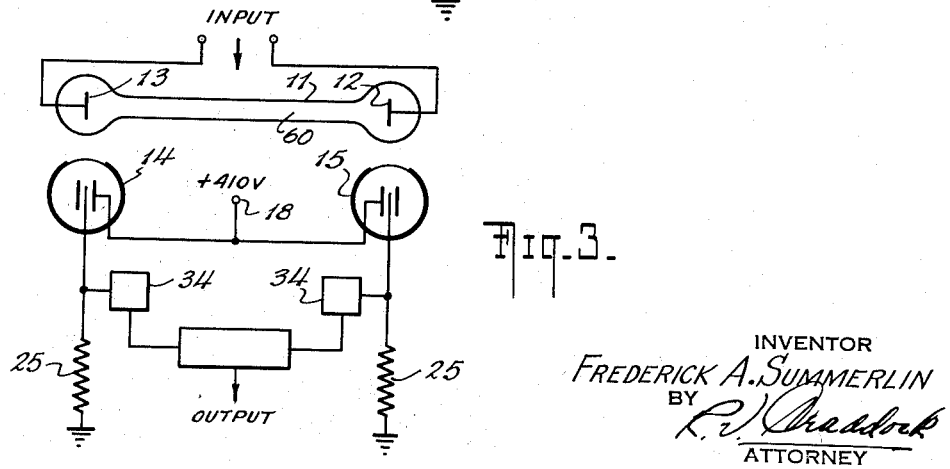

If a double integration of the current in the electrolytic cell is required it is preferred to use Geiger counters similar to those described with reference to FIGURES 1 and 2 in a circuit of the kind shown diagrammatically in FIGURE 3. The output from each counter 14 or 15 appears across a series resistor which is similar to the resistor 25 shown in FIGURE 2 and is fed into a scaling device 34 which produces an output pulse in response to, say, every eighth pulse corresponding to a disintegration detected by the counter. The pulses from the two scalers 34 are fed into a reversible mechanical counter which produces a fixed movement of a shaft for every input pulse, the movement being in one direction or the other according to which of the two scalers supplies the pulse.

Of course equivalent electronic circuits could be used in place of this mechanical device.

The invention is expected to be of value in the field of aircraft control and navigation where the integration of electrical quantities, for example a quantity proportional to the acceleration in a certain direction, are required to be measured and it is also expected to be useful in many different industries where an output is to be controlled in accordance with a varying input signal.

For example, the invention could be used in a three-term controller which is a device for producing an output in dependence on an input and which has three settable units, one of which is used to determine the sensitivity of the device, i.e., the size of the output for unit input; one of which is used to determine the magnitude of a component in the output which is proportional to the rate of change of the input; and one of which is used to determine the magnitude of a component in the output which is proportional to the integral of the input. It is for the last of these three units that the integrators according to the present invention are expected to have utility.

Radio-active cobalt 60 is available which gives $7.4 \times 10^{10}$ disintegrations per second per gramme. The percentage of radio-active cobalt to non-radioactive cobalt might be about $3 \times 10^{-5}$. This assumes that we want 40 disintegrations per second per electrode (the quantity of radioactive cobalt per electrode is about $5.4 \times 10^{-10}$ grammes) and want to integrate a current of 1 microamp for 1 hour (this would deposit 3.6 milligrams of cobalt).

The strength of the solution will depend upon the conductivity required.

What is claimed is:

An integrating device comprising an elongated envelope containing an electrolytic solution having radio-active material therein, a pair of electrodes also containing a predetermined amount of said radio-active material supported within said envelope at each end thereof and immersed within said electrolytic solution, means for applying an input signal to said electrodes the current of which is dependent upon the quantity to be integrated whereby a radio-active material is deposited on one of said electrodes, the amount of such deposit on said electrode being dependent upon the direction, magnitude and time of duration of said input signal, a radio-active disintegration-detecting device arranged at each end of said envelope and adjacent to said electrodes, a disintegration counting circuit coupled to the output of each of said detectors for supplying a signal proportional to the number of disintegrations which occurred at the electrode over a predetermined time interval, and a difference network responsive to said last-mentioned signals for supplying an output proportional to the difference therebetween, said difference output being proportional to the time integral of the input signal supplied to said electrode whereby the net change in the output of the difference network is proportional to the transfer of the mass which is proportional to the integral of the current which has been flowing since an initial condition.

References Cited in the file of this patent
UNITED STATES PATENTS

| 411,042 | Kolle | Sept. 17, 1889 |
| 2,058,774 | Colligan | Oct. 27, 1936 |
| 2,315,845 | Ferris | Apr. 6, 1943 |
| 2,365,553 | Hill | Dec. 19, 1944 |
| 2,378,328 | Robinson | June 12, 1945 |
| 2,477,776 | Talbot | Aug. 2, 1949 |
| 2,640,788 | Rockett | June 2, 1953 |
| 2,680,900 | Linderman | June 15, 1954 |

OTHER REFERENCES

Tracer Technique for Studying Gear Wear, by Barsoff et al., Nucleonics, vol. 10, No. 10, October 1952, pages 67 to 69.